(12) United States Patent
Yokoi et al.

(10) Patent No.: US 6,998,784 B2
(45) Date of Patent: Feb. 14, 2006

(54) VEHICULAR HEADLAMP

(75) Inventors: Shoichiro Yokoi, Shizuoka (JP); Kazuki Okui, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/719,873

(22) Filed: Nov. 21, 2003

(65) Prior Publication Data

US 2004/0114389 A1    Jun. 17, 2004

(30) Foreign Application Priority Data

Nov. 28, 2002 (JP) ............................. 2002-344825

(51) Int. Cl.
*B60Q 1/02* (2006.01)
*B60Q 1/00* (2006.01)
*F21V 19/02* (2006.01)

(52) U.S. Cl. ...................... 315/82; 307/10.1; 362/507; 362/523

(58) Field of Classification Search .................. 315/77, 315/82; 307/10.1, 10.8; 362/487, 507, 512, 362/523, 525, 549; B60Q 1/02, 1/00; F21V 19/02

See application file for complete search history.

(56) References Cited

U.S. PATENT DOCUMENTS

| | | | | |
|---|---|---|---|---|
| 5,113,330 A | * | 5/1992 | Makita | 362/265 |
| 5,879,073 A | * | 3/1999 | Hori et al. | 362/344 |
| 6,089,887 A | * | 7/2000 | Ozaki | 439/139 |
| 6,161,951 A | * | 12/2000 | Yoneyama et al. | 362/516 |
| 6,234,655 B1 | * | 5/2001 | Suehiro et al. | 362/515 |
| 6,540,385 B2 | * | 4/2003 | Ikeda et al. | 362/512 |
| 2002/0097585 A1 | | 7/2002 | Mochizuki et al. | 362/517 |

* cited by examiner

*Primary Examiner*—Thuy Vinh Tran
(74) *Attorney, Agent, or Firm*—Koda & Androlia

(57) ABSTRACT

A vehicular headlamp including a beam radiation unit that has a discharge bulb as a light source and is rotatably supported in a lamp body, an illumination circuit unit that illuminates the discharge bulb, and a cord that connects the illumination circuit unit and the discharge bulb, the cord being held at its middle portion so as to be prevented from being moved around with respect to the lamp body.

3 Claims, 8 Drawing Sheets

VEHICULAR HEADLAMP

BACKGROUND OF THE INVENTION

1. Field of the Invention

The present invention relates to a vehicular headlamp and more particularly to a vehicular headlamp that includes a beam radiation unit rotatably installed inside a lamp body.

2. Prior Art

One of known headlamps for vehicles, for example automobile headlamps, includes a beam radiation unit that has a discharge bulb as its light source and is rotatably supported inside the lamp body. In this headlamp, the beam radiation unit is rotated in the steering direction in accordance with, for instance, the steering operations so that the front of the vehicle is illuminated more intensely.

For the discharge bulb to be lit, it is necessary to apply high DC illumination voltage. For this purpose, an illumination circuit that includes a ballast circuit and an actuation circuit (starter circuit) are required in which the ballast circuit is formed with a DC-DC pressure increase circuit that increases the voltage from a DC power source and with a DC-AC switch circuit that converts the thus increased DC voltage to AC voltage (illumination voltage), and the actuation circuit (starter circuit) applies voltage which is necessary to actuate the discharge bulb (starting discharging) to the illumination voltage.

In this structure, the illumination circuit and the discharge bulb are connected via a cord. The illumination circuit is generally not a small circuit size-wise that can be connected directly to a connector of the discharge bulb; rather it occupies a large space and has a significant weight when the illumination circuit is formed as an illumination circuit unit that is housed inside a metallic case in view of the electromagnetic shield and heat released from heat-generating parts, etc.

Because of these situations, the illumination circuit is mounted on the lamp body, and the illumination circuit unit and the discharge bulb are connected via a cord.

In this case, if the beam radiation unit is installed so as to be rotated freely, several problems occur. The cord deforms and moves around every time the beam radiation unit is rotated, thus contacting with other components inside the lamp body and getting damaged. In addition, the cord is caught by other members, and the rotation of the beam radiation unit is hindered. Furthermore, the beam radiation unit cannot rotate as expected if a portion of the cord that is deformed or moved upon rotation of the beam radiation unit is long and the cord becomes unable to deform freely when the cord is frozen at low temperatures, making the rotation of the beam radiation unit difficult.

SUMMARY OF THE INVENTION

Therefore, the object of the present invention is to provide a vehicle headlamp in which the deformation and movement of the cord that connects a discharge bulb illumination circuit unit and a discharge bulb is minimized despite the rotation of the beam radiation unit.

The above object is accomplished by a unique structure of the present invention for a vehicular headlamp that comprises a beam radiation unit which includes a discharge bulb as a light source and is rotatably supported in a lamp body, an illumination circuit unit which illuminates the discharge bulb, and a cord which connects the illumination circuit unit and the discharge bulb; and in the present invention, the cord is, at its middle portion, held so as to be prevented from moving around with respect to the lamp body.

In this structure of the vehicular headlamp of the present invention, the movement or deformation of the cord that would be caused by the rotational movement of the beam radiation unit is prevented. Accordingly, the cord does not scrape against or is not caught by peripheral members when the beam radiation unit is rotated. In addition, the movement of the cord can be minimized.

DETAILED DESCRIPTION OF THE INVENTION

A description of embodiments of the vehicular headlamp according to the present invention will be given below with reference to the accompanying drawings. In the embodiments, the present invention is applied to a vehicular headlamp for automobiles.

Figure 1:
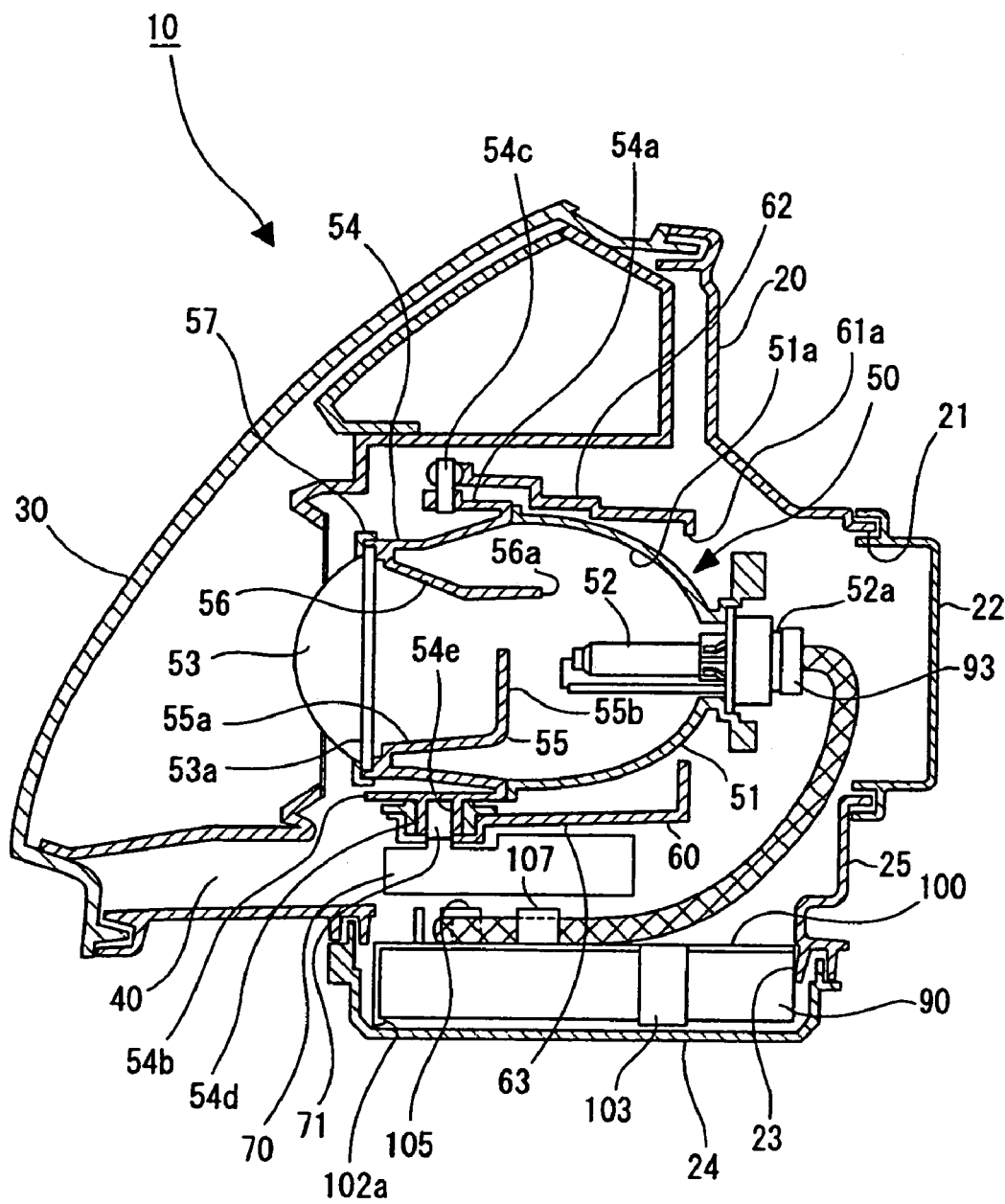
FIG. 1 shows in cross-section the first embodiment of the vehicular headlamp according to the present invention.

As seen from FIG. 1, the vehicular headlamp 10 includes a lamp body 20 that has a front-opening concave portion, and the front-opening of the lamp body 20 is covered by a cover 30, thus forming a lamp chamber 40 with its space almost hermetically sealed. A rear opening 21 for operation purposes is provided in the back of the lamp body 20, and this rear opening 21 is covered by a detachable back cover 22. A bottom opening 23 that has a substantially rectangular shape is provided in the bottom of the lamp body 20, and this bottom opening 23 is covered by a bottom cover 24.

A beam radiation unit 50 is installed inside the lamp chamber 40 so as to be rotatable in the lateral direction.

The beam radiation unit 50 includes a reflector 51, a discharge bulb 52 detachably supported by the reflector 51, a convex lens 53 disposed in front of the reflector 51, and a lens holding frame 54 that holds the convex lens 53.

The reflector 51 is formed with a reflecting surface 51a that collects light radiated from the discharge bulb 52 in a given light collection zone, the substantially cylindrical lens holding frame 54 is fixed continuously to the front end of the reflector 51, and the convex lens 53 is held so as to cover the front end of the lens holding frame 54.

The lens holding frame 54 is in a cylindrical shape with its diameter thereof becoming smaller toward the front end, and upper and lower supported pieces 54a and 54b are provided to project toward the front substantially horizontally from both upper/lower ends at the rear end portion. A supporting axle 54c is provided upwardly at the end portion of the upper supported piece 54a; and a connection axle 54d that projects downward is provided on the end portion of the lower supported piece 54b so as to be immediately below the supporting axle 54c. In addition, a downward-opening engagement concave portion 54e is formed in the connection axle 54d.

The lens holding frame 54 has, at its lower front end, an integrally-formed light shielding member 55. The light shielding member 55 is comprised of a base portion 55a and a light shielding portion 55b that are integrally formed with each other, the base portion 55a extending inward and rearward from the lower front end of the lens holding frame 54, and the light shielding portion 55b projecting upward from the rear end of the base portion 55a. The upper end of the light-shielding portion 55b is located in the light collection zone of the reflector 51. The lens holding frame 54 further has a shade body 56 that extends inward and rearward and is integrally formed at the upper front end of the lens holding frame 54. The rear end 56a of the shade body 56 extends above the light shielding portion 55b of the light shielding member 55 and further rearward than the light shielding portion 55b. With this shade body 56, light emitted from the discharge bulb 52 but not collected in the given light collection zone is shielded against the convex lens 53, so that glare light is not emitted.

The reference numeral 57 is a stopper ring that is provided at the front end of the lens holding frame 54. The rim portion 53a at the peripheral edge of the convex lens 53 is held between the stopper ring 57 and the front end of the lens holding frame 54. With this structure, the convex lens 53 is held at the front end of the lens holding frame 54, and the focal point of the convex lens 53 is located in the vicinity of the upper end of the light shielding portion 55b of the light shielding member 55.

In the above beam radiation unit 50, light radiated from the discharge bulb 52 and reflected by the reflecting surface 51a of the reflector 51 is collected in the light collection zone in the vicinity of the upper end of the light shielding portion 55b of the light shielding member 55, and the collected light is radiated forward by the convex lens 53. During this radiation of the collected light, since the upper edge of the beam radiated forward by the convex lens 53 is analogous to the upper end of the light shielding portion 55b, a so-called "cut line" is formed. Accordingly, the above beam radiation unit 50 is suitable for radiating low beam among beams of vehicular headlamps.

The beam radiation unit 50 is supported in the lamp body 20 via a bracket 60.

Figure 2:
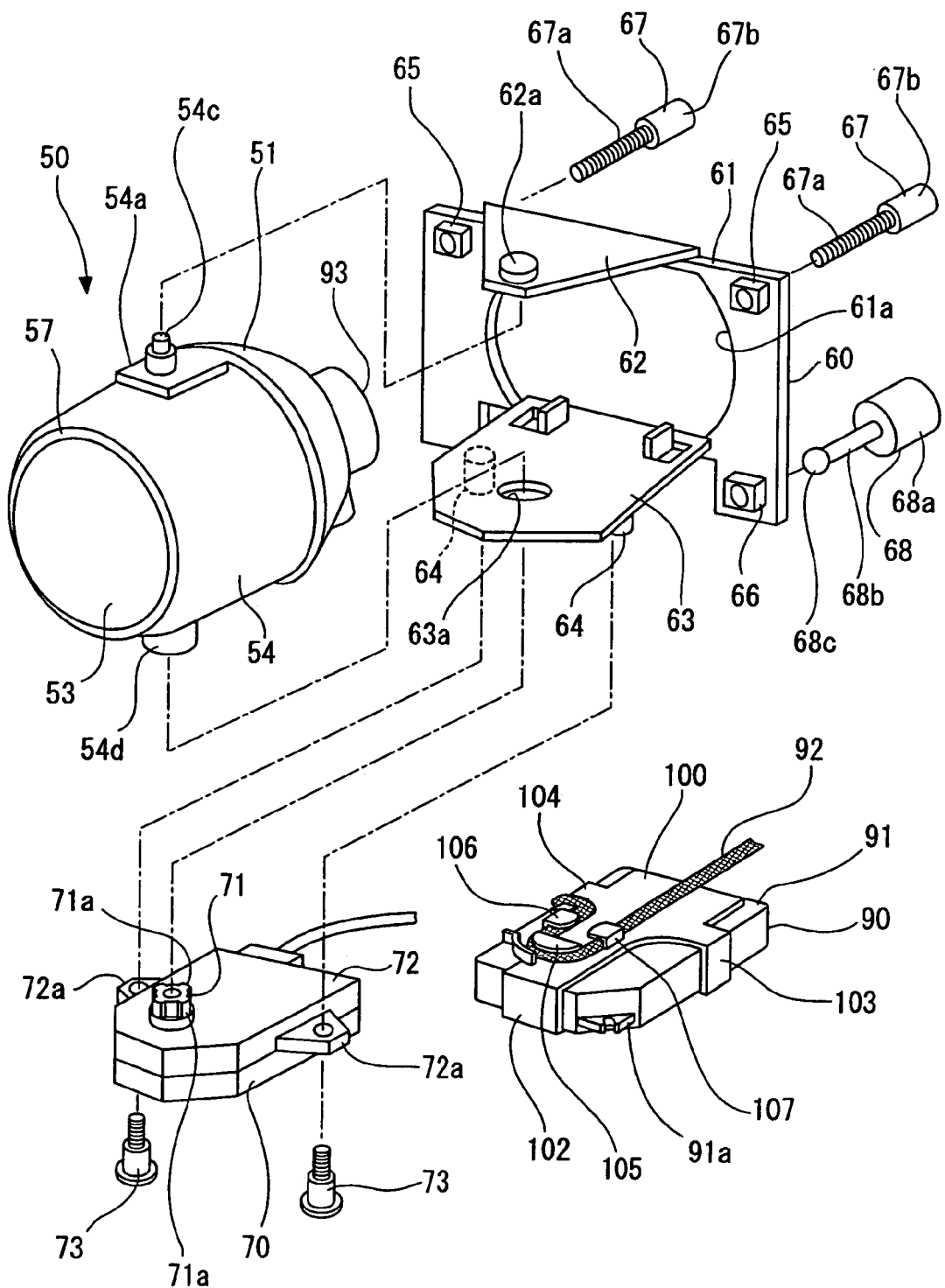
FIG. 2 is a perspective view of the essential portion of the headlamp disassembled.

As seen from FIG. 2, the bracket 60 includes a main plate 61 that has a substantially rectangular shape, and the main plate 61 has a fairly large opening 61a. Upper and lower supporting plates 62 and 63 respectively project forward from above and below the opening 61a of the main plate 61. A bearing portion 62a is provided at the front edge portion of the upper supporting plate 62, and an insertion hole 63a is opened at the front edge portion of the lower supporting plate 63 so as to be immediately below the bearing portion 62a. Two boss elements 64 are provided on the lower face of the lower supporting plate 63 with a space in between.

The bracket 60 is inclinably supported in the lamp body 20 by a known method. More specifically, as seen from FIG. 2, nut members 65 are provided at upper right and left corners of the main plate 61 of the bracket 60, and a sphere-bearing member 66 is provided on the main plate 61 so as to be below one of the nut members 65. The reference numerals 67 are adjustment shafts, and each adjustment shaft 67 has a threaded shank portion 67a and an operation head 67b which is at the rear end of the threaded shank portion 67a. The adjustment shafts 67 are rotatably supported in the rear side wall 25 of the lamp body 20, and the threaded shank portions 67a are screwed into the nut members 65 of the bracket 60, respectively. The reference numeral 68 is a leveling adjuster, and it has a drive axle 68b that travels in the travelling direction by a drive source (not shown) housed in a case body 68a thereof, and a spherical body 68c is provided at the front end of the drive axle 68b. The case body 68a is fixed to the lamp body 20, and the spherical body 68c is rotatably fitted in a spherical concave portion (not shown) provided on the sphere-bearing member 66 that is supported in the bracket 60. The drive source of the leveling adjuster 68 is operated by the driver of the vehicle or by an automatic control based on the inclination of the vehicle detected by a sensor, in particular, inclinations in the travelling direction. The drive axle 68b of the leveling adjuster 68 travels (or is moved) in the traveling (front/rear) direction by the drive source.

The bracket 60 provided in the lamp body 20 as described above is inclined as described below; and as the bracket 60 is moved inclinably, the beam radiation unit 50 provided in the bracket 60 is also moved inclinably.

More specifically, when the leveling adjuster 68 is actuated, the drive axle 68b travels in the travelling direction or is moved back and forth; as a result, the portion of the bracket 60 that is connected to the end of the drive axle 68b and supports the sphere-bearing 66 travels in the travelling direction. Accordingly, the bracket 60 is inclinably moved along the imaginary line that connects the portions supported by the adjustment shafts 67; in other words, the bracket 60 is inclinably moved along the imaginary line that connects the nut members 65. Therefore, the beam of the headlamp can be radiated in the direction appropriate for the inclination of the vehicle.

In addition, the radiation axis of the beam can be fine-adjusted by rotating either one of or both of the adjustment shafts 67. In other words, when two of the adjustment shafts 67 are rotated by the same amount in the same direction, two portions that support the nut members 65 of the bracket 60 travel in the same travelling direction for the same amount. Accordingly, the bracket 60 is inclinably moved in the vertical direction with respect to the portion where the bracket 60 is supported in the leveling adjuster 68 as an inclination supporting point, that is, a portion where the sphere-bearing 66 is supported. When, on the other hand, one of the adjustment shafts 67 is rotated, then the bracket 60 is inclinably moved with respect to the imaginary line that connects a portion supporting the nut member 65 into which the adjustment axis 67 that has not been rotated is screwed and a portion supporting the sphere-bearing member 66. The inclination adjustment of the bracket 60 by rotating the adjustment shafts 67 as above is carried out to obtain an appropriate radiation angle during the so-called "initial aiming;" in other words, the inclination adjustment of the bracket 60 is done when the vehicle is initially shipped factory, when the vehicle is regularly inspected at shops, or under other conditions, with no load or under the state of almost to no load, which are the conditions when no occupants and/or cargo are/is on the vehicle or only a driver is in the vehicle.

The beam radiation unit 50 is supported in the bracket 60 so as to be rotated laterally. In other words, the supporting axle 54c that projects upward from the upper portion of the beam radiation unit 50 is rotatably fitted in the bearing portion 62a of the upper supporting plate 62 of the bracket 60, while the connection axle 54d that projects downward from the lower portion of the beam radiation unit 50 is rotatably inserted in the insertion hole 63a of the lower supporting plate 63 on the bracket 60. Furthermore, an output shaft of a swivel drive section (described below) that is mounted on the bracket 60 is connected to the connection-axle 54*d*. Accordingly, the beam radiation unit 50 is rotated in the lateral direction as the swivel drive section is driven. The rear portion of the beam radiation unit 50 projects backward through the opening 61 of the bracket 60.

The swivel drive section 70 is, for example, driven in response to the steering operations and rotates an output shaft 71. As shown in FIG. 2, the output shaft 71 is a spline axle and has a plurality of projections 71*a* that extend in the axial direction. Connecting tongues 72*a* project sideways on the right and left sides of the case 72 of the swivel drive section 70, and screws 73 are inserted into the holes of the connecting tongues 72*a* from below and screwed into the boss elements 64 of the lower supporting plate 63 of the bracket 60, so that the swivel drive section 70 is attached to the lower surface of the supporting plate 63. Since the engagement concave portion 54*e* provided in the connection axle 54*d* of the beam radiation unit 50 has a shape that corresponds to that of the output shaft 71 of the swivel drive section 70, the output shaft 71 is engaged with the engagement concave portion 54*e*, thus coupling the connection axle 54*d* of the beam radiation unit 50 to the output shaft 71 of the swivel drive section 70.

Accordingly, when the swivel drive section 70 is driven, the output shaft 71 rotates; and as the output shaft 71 rotates, the beam radiation unit 50 is rotated in the lateral direction.

An illumination circuit is required to illuminate the discharge bulb 52.

Figure 6:
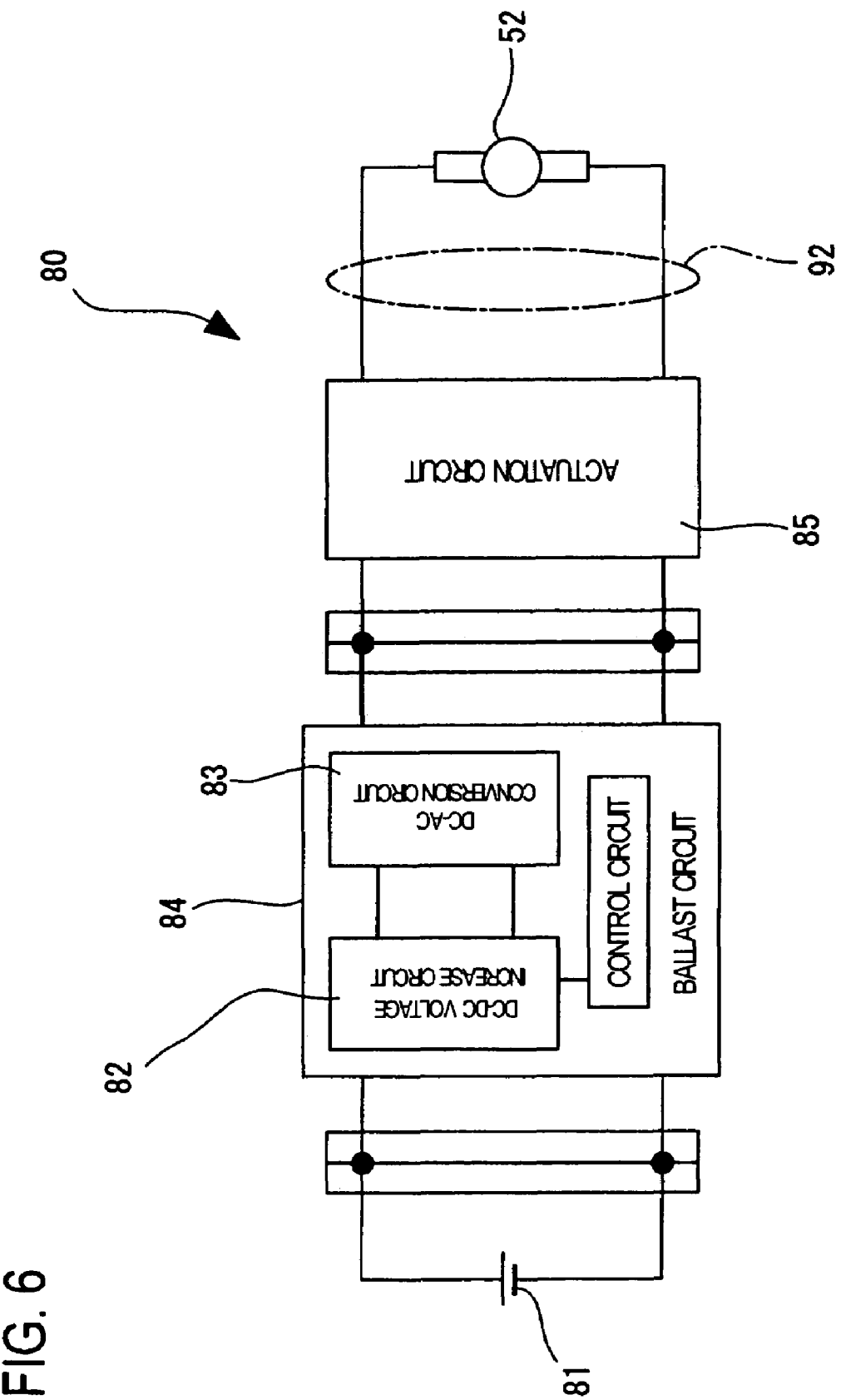
FIG. 6 is a block diagram of the illumination circuit.

FIG. 6 shows the discharge bulb illumination circuit 80 for illuminating the discharge bulb 52.

The discharge bulb illumination circuit 80 includes a ballast circuit 84. The ballast circuit 84 increases the power supply voltage of a battery 81 by a DC-DC voltage increase circuit (DC/DC converter) 82, converts it into high AC voltage by a DC-AC conversion circuit (DC/AC converter) 83 to generate illumination voltage, and applies this illumination voltage to the discharge bulb 52. An actuation circuit (starter circuit) 85 is provided in the discharge bulb illumination circuit 80, and actuation voltage being superimposed on the illumination voltage is applied to the discharge bulb 52 when actuating the discharge bulb 52.

As shown in FIG. 1, an illumination circuit unit 90 in which the discharge bulb illumination circuit 80 is housed in a case body 91 is provided in the lower portion of the lamp body 20. The case body 91 is, considering electromagnetic shield and heat release from heat-generating parts, formed of metal such as aluminum die-cast. As seen from FIGS. 3, 4 and 5, connecting tongues 91*a* are provided on the case body 91 so as to project sideward. The discharge bulb illumination circuit 80 and the discharge bulb 52 are connected via a cord 92 and a bulb socket 93. The bulb socket 93 is detachably attached to the screw base 52*a* of the discharge bulb 52, and the cord 92 that connects the bulb socket 93 and the discharge bulb illumination circuit 80 is covered with a metallic net 92*a* so that noise is not emitted from the cord 92.

The illumination circuit unit 90 is mounted to the lamp body 20 so as to be near the bottom opening 23 by screws (not shown) that are inserted in the connecting tongues 91*a* and screwed to the peripheral area of the bottom opening 23 of the lamp body 20. Then, the cover 24 is attached to the lamp body 20 to cover the entire illumination circuit unit 90.

As seen from FIGS. 2 through 5, a clamp member 100 is attached to the illumination circuit unit 90.

The clamp member 100 is made of synthetic resin; and it has an top plate 101, which is in contact with the upper surface of the illumination circuit unit 90, and engagement pieces 102, 103 and 104, which project downward from three locations of the top plate 101. The front engagement piece 102 extends downward along the front face of the illumination circuit unit 90, and an engagement hook 102*a* formed at the lower end of the engagement piece 102 engages with the front edge of the lower face of the illumination circuit unit 90. The side engagement pieces 103 and 104 extend downward along the side faces of the illumination circuit unit 90 that are located at both ends in the direction orthogonal to the lengthwise direction of the illumination circuit unit 90. Engagement hooks 103*a* and 104*a* are formed at the lower ends of the side engagement pieces 103 and 104, and they engage with the side edges located at both ends in the direction orthogonal to the longitudinal (lengthwise) direction of the lower surface of the illumination circuit unit 90 (FIG. 5 clearly shows the engagement of each one of the engagement hooks).

As seen from the above, the clamp member 100 is disposed on the illumination circuit unit 90 with the engagement hooks 102*a*, 103*a* and 104*a* of the engagement pieces 102, 103 and 104 being engaged with the front and side edges of the illumination circuit unit 90.

Figure 3:
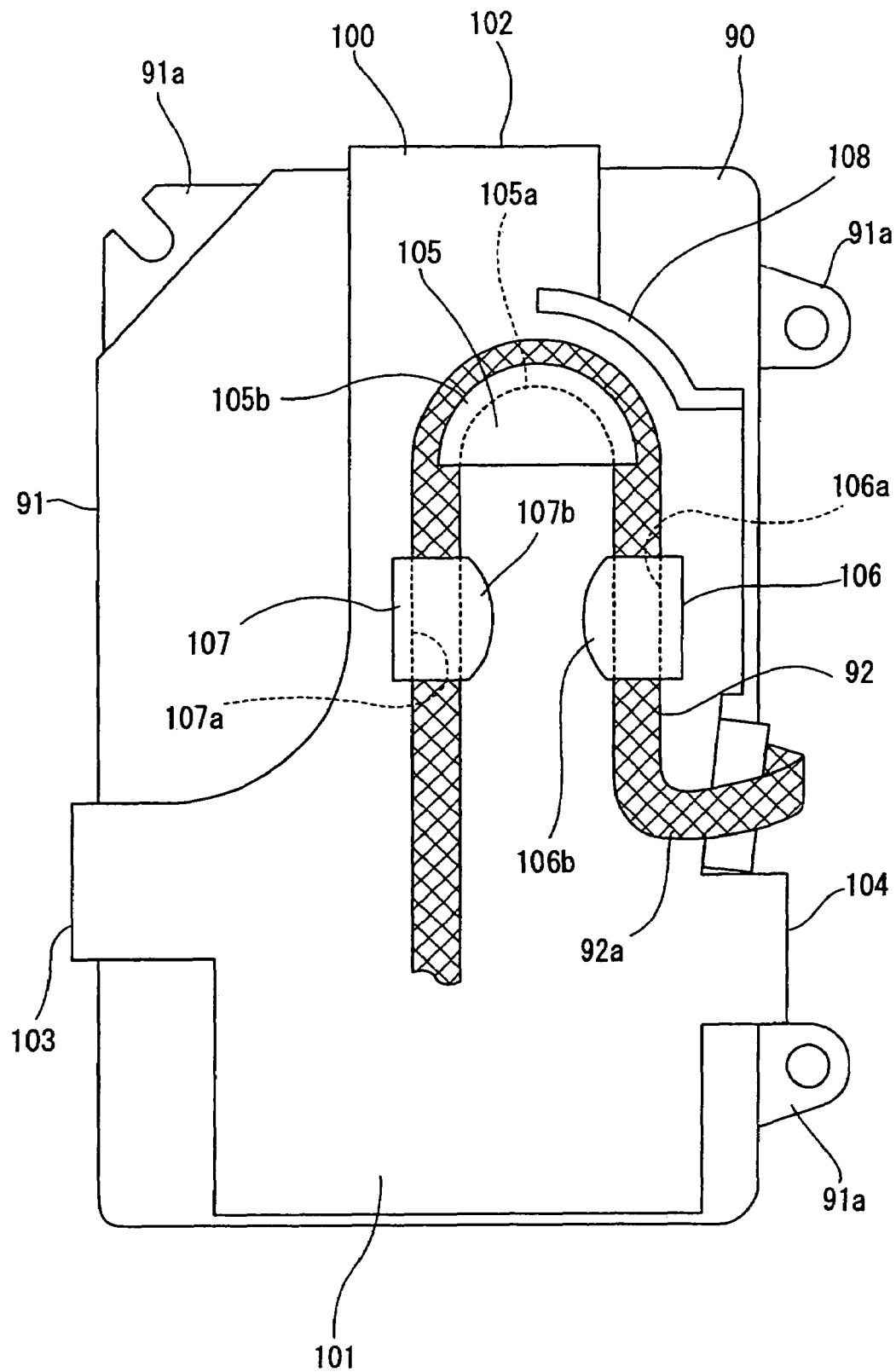
FIG. 3 is a top view of the illumination circuit unit that has a clamp member thereon.
Figure 4:
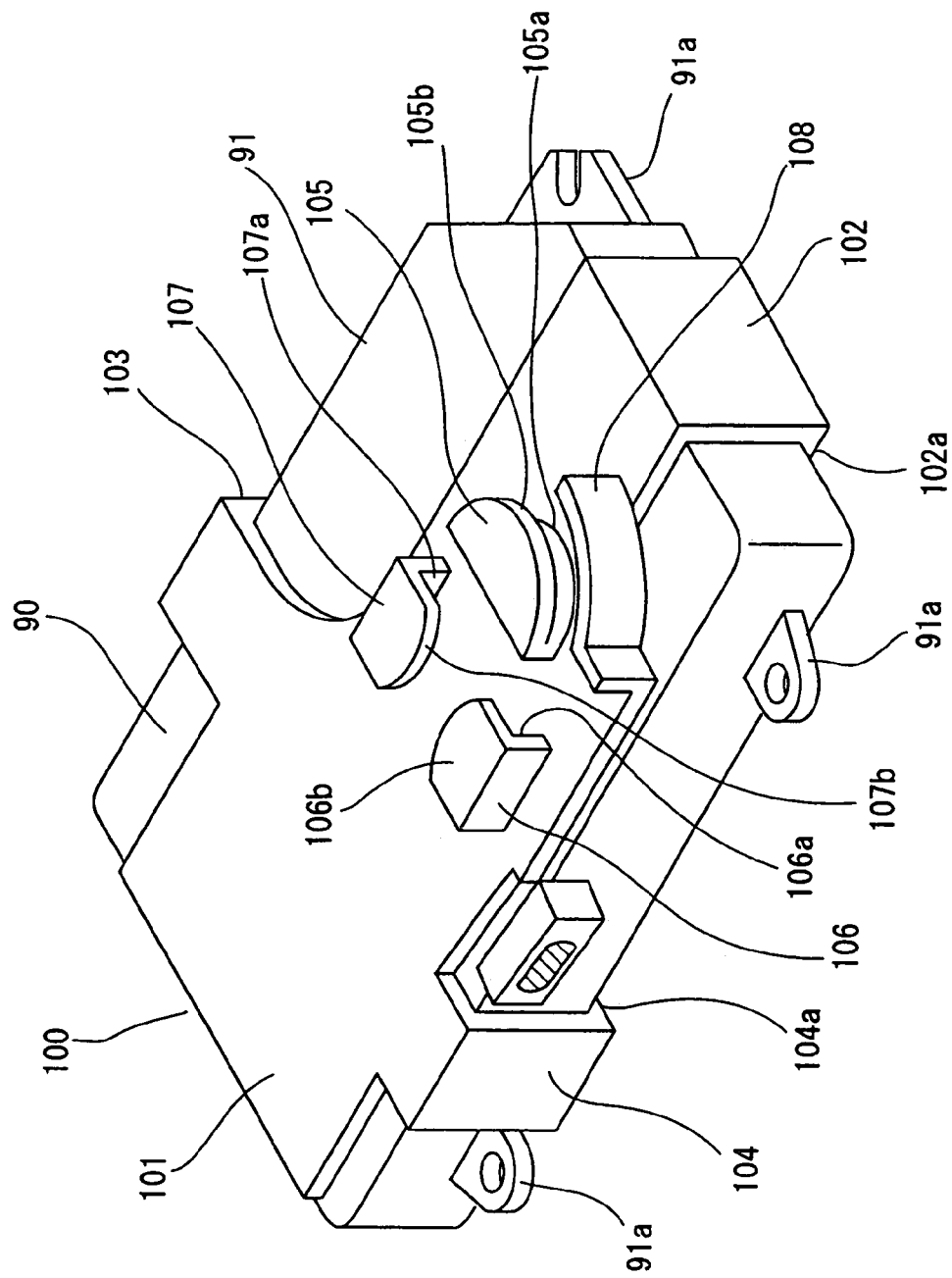
FIG. 4 is a perspective view thereof.
Figure 5:
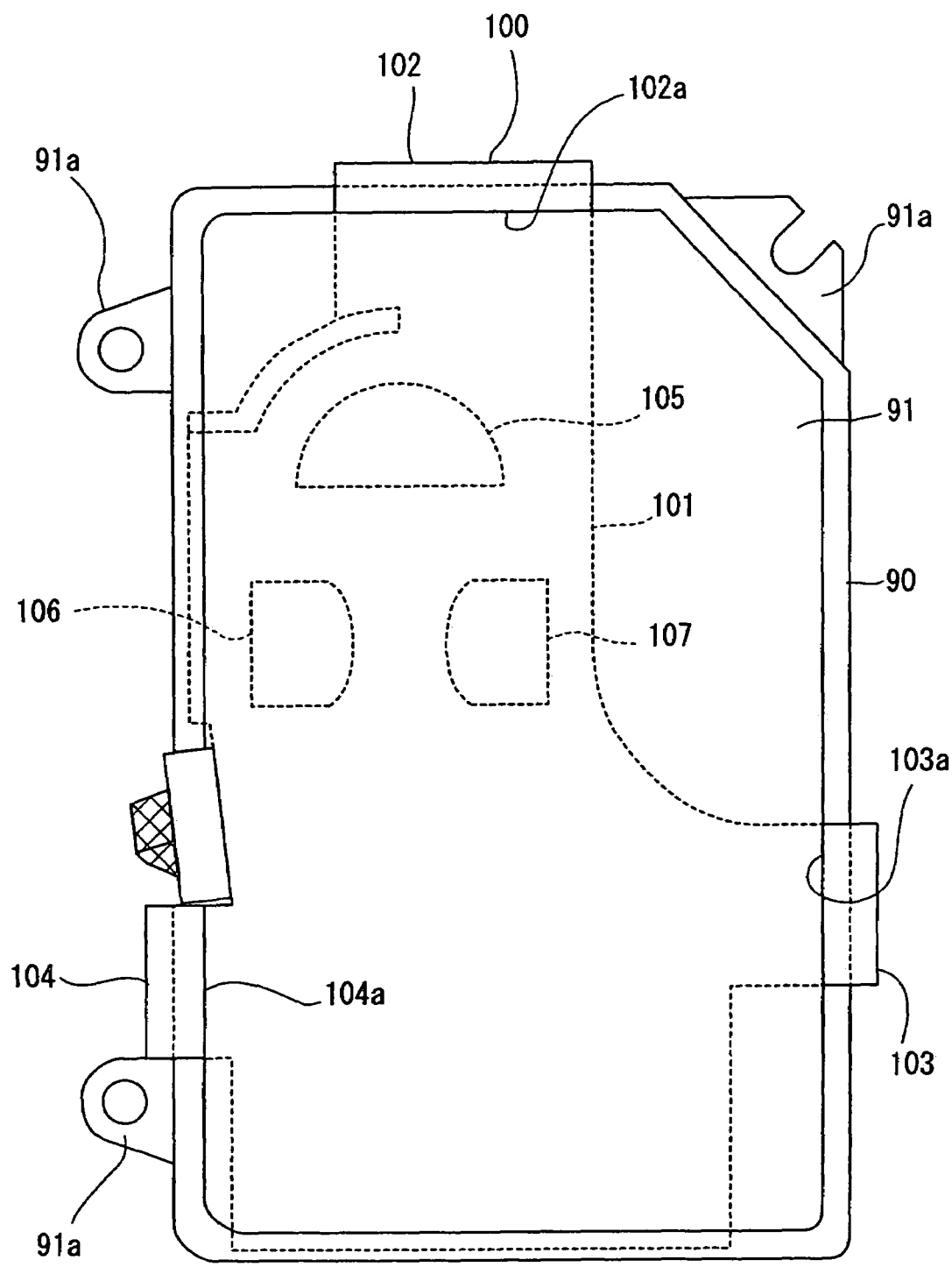
FIG. 5 is a bottom view thereof.

As best seen from FIGS. 3 and 4, three cord holders 105, 106 and 107 are provided on the upper surface of the top plate 101 of the clamp member 100 so as to project upward (in FIG. 4).

The central cord holder 105 holds the cord 92 such that the cord make a curve along this central cord holder 105, and it is comprised of a curved wall 105*a* that curves in a semi-circular shape (see FIG. 3) when viewed from above and a protection wall 105*b* that projects so as to face the upper surface of the top plate 101. A restriction wall 108 rising from the top plate 101 is provided near the central cord holder 105. The restriction wall 108 faces the curved wall 105*a* for a substantially half (the right side half in FIG. 3) the entire length thereof with a predetermined distance in between.

The first cord holder 106 is disposed at a location halfway between the position where the cord 92 is led out of the case body 91 and the position where the central cord holder 105 is disposed. The first cord holder 106 is comprised of a guide wall 106*a* that projects upward from the upper surface of the top plate 101 and a protection wall 106*b* that projects from the guide wall 106 and faces the upper surface of the top plate 101.

The second cord holder 107 is disposed at a location that directly faces the first cord holder 106 with respect to an imaginary line that extends through the center of the cord holder 105 in the longitudinal direction of the illumination circuit unit 90. The second cord holder 107 is comprised of a guide wall 107*a* that projects upward from the upper surface of the top plate 101 and a protection wall 107*b* that projects from the guide wall 107*a* so as to face the upper surface of the top plate 101.

In the first and second cord holders 106 and 107, their guide walls 106*a* and 107*a* face each other, and the cord 92 is as best seen from FIG. 3 guided along these facing sides of the first and second cord holders 106 and 107.

As shown in FIGS. 3 and 4, the cord 92 is arranged such that it is led out of the case body 91, guided along the side (or inner) face of the guide wall 106*a* of the first cord holder 106 (facing the second cord holder 107), and guided along the side (or outer) face of the curved wall 105*a* of the central cord holder 105 that partially faces the restriction wall 108, and then guided along the side (inner) face of the guide wall 107a of the second cord holder 107 (facing the first cord holder 106). The cord 92 is brought upward and led to the bulb socket 93.

As seen from the above, the cord 92 is bent in a substantially U-shape at its middle portion by being held by the respective cord holders 105, 106 and 107 with its curved portion held by the central cord holder 105. Further, when the cord 92 is set on the clamp member 100, the portion held by the cord holders 105, 106 and 107 is disposed on or in the vicinity of the rotational axis of the beam radiation unit 50, that is, on an imaginary extension line connecting the supporting axle 54c and the connection axle 54d of the beam radiation unit 50 as seen from FIG. 1.

The cord 92 is tightly held by the cord holders 105, 106 and 107 such that the cord is immovable inside the cord holders 105, 106 and 107. The cord 92, however, can be held somewhat loosely so that the cord is movable slightly inside the cord holders 105, 106 and 107.

In the vehicular headlamp 10 described above, the cord 92 that connects the illumination circuit unit 90 and the discharge bulb 52 (bulb socket 93) is securely set on the clamp member 100, and the portions of the cord except for the portion that is on the rotational axis of the beam radiation unit 50 or the portion that is from the vicinity of the rotational axis of the beam radiation unit 50 to the bulb socket 93 are not freely moved or deformed. Accordingly, a danger that the cord 92 is caught by other components or members inside the lamp body 20 when the beam radiation unit 50 is rotated is prevented, and thus the damages to those components or members, or to itself (cord), is prevented.

In addition, since the portion of the cord on the rotational axis of the beam radiation unit 50 or the portion of the cord that is from the vicinity of the rotational axis of the beam radiation unit 50 to the bulb socket 93 is movable or can be deformed, the beam radiation unit 50 is not prevented from being rotated freely.

Moreover, in the above structure, the portion of the cord 92 that is held by the cord holders 105, 106 and 107 is located on or in the vicinity of the rotational axis of the beam radiation unit 50, that is, on the imaginary extension line that connects the supporting axle 54c and the connection axle 54d. Accordingly, the deformation of the cord 92 occurs slightly only in the vicinity of the above-described rotational axis. In addition, the portion of the cord 92 that is from the second cord holder 107 to the bulb socket 93 is moved together with the beam-radiation unit 50. Accordingly, the cord 92 does not prevent the rotational movement of the beam radiation unit 50. Thus, it will not happen that the beam radiation unit 50 is not rotated when freeze of the cord 92 occurs in a cold region.

Further, breaking of the cord is prevented since the movement of the cord 92 is restricted to the minimum.

Furthermore, since the most part of the cord 92 is held by the clamp member 100 provided on the illumination circuit unit 90, the cord 92 does not get in the way when assembling the components to the lamp body 20, and thus the assembling of the lamp body can be done easily and efficiently.

In addition, since the cord 92 is held on the illumination circuit unit 90 via the clamp member 100, the top plate 101 of the clamp member 100 is located between the cord 92 and the illumination circuit unit 90. Accordingly, the cord 92 does not scrape against the case body 91 of the illumination circuit unit 90, and damages to the cord 92 and case body 91 due to scraping are prevented.

In the above vehicular headlamp 10, the illumination circuit unit 90 includes the entire discharge bulb illumination circuit 80 inside the case body 91. However, though the ballast circuit 84 can be installed inside the case body 91 as the illumination circuit unit 90, the actuation circuit 85 can be provided outside the case body 91 so that it is housed inside the bulb socket 93. Since the actuation circuit 85 can be much smaller than the ballast circuit 84, the bulb socket 93 never becomes significantly large.

The first embodiment described above includes the clamp member 100 that is mounted on the illumination circuit unit 90 which is fixed to the lamp body 20, and this clamp member 100 holds the cord 92 thereon so that the middle portion of the cord 92 that is held by the cord holders 105, 106 and 107 does not move around with respect to the lamp body 20.

Figure 7:
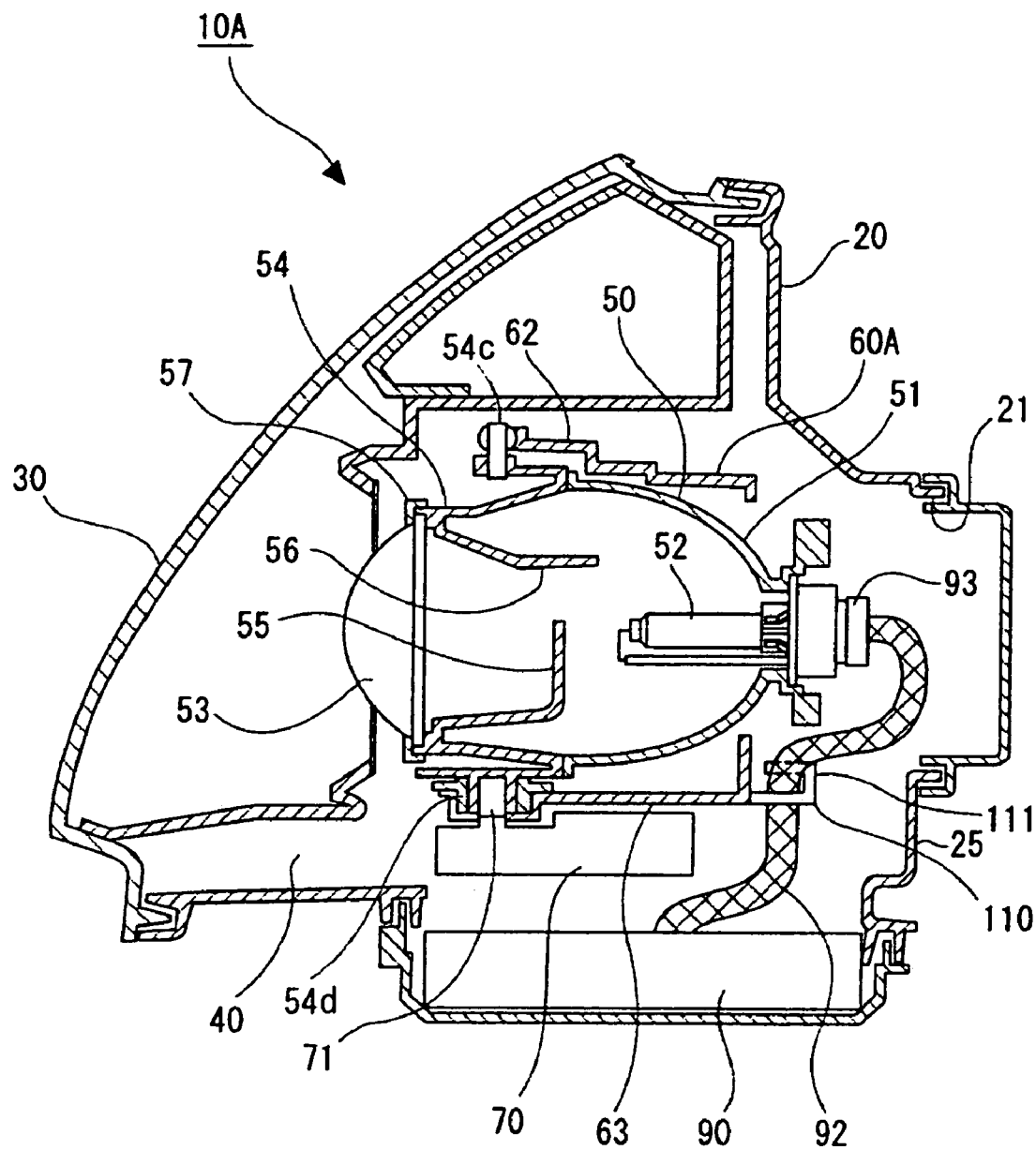
FIG. 7 is a vertical cross-sectional view of the vehicular headlamp of the second embodiment of the present invention.
Figure 8:
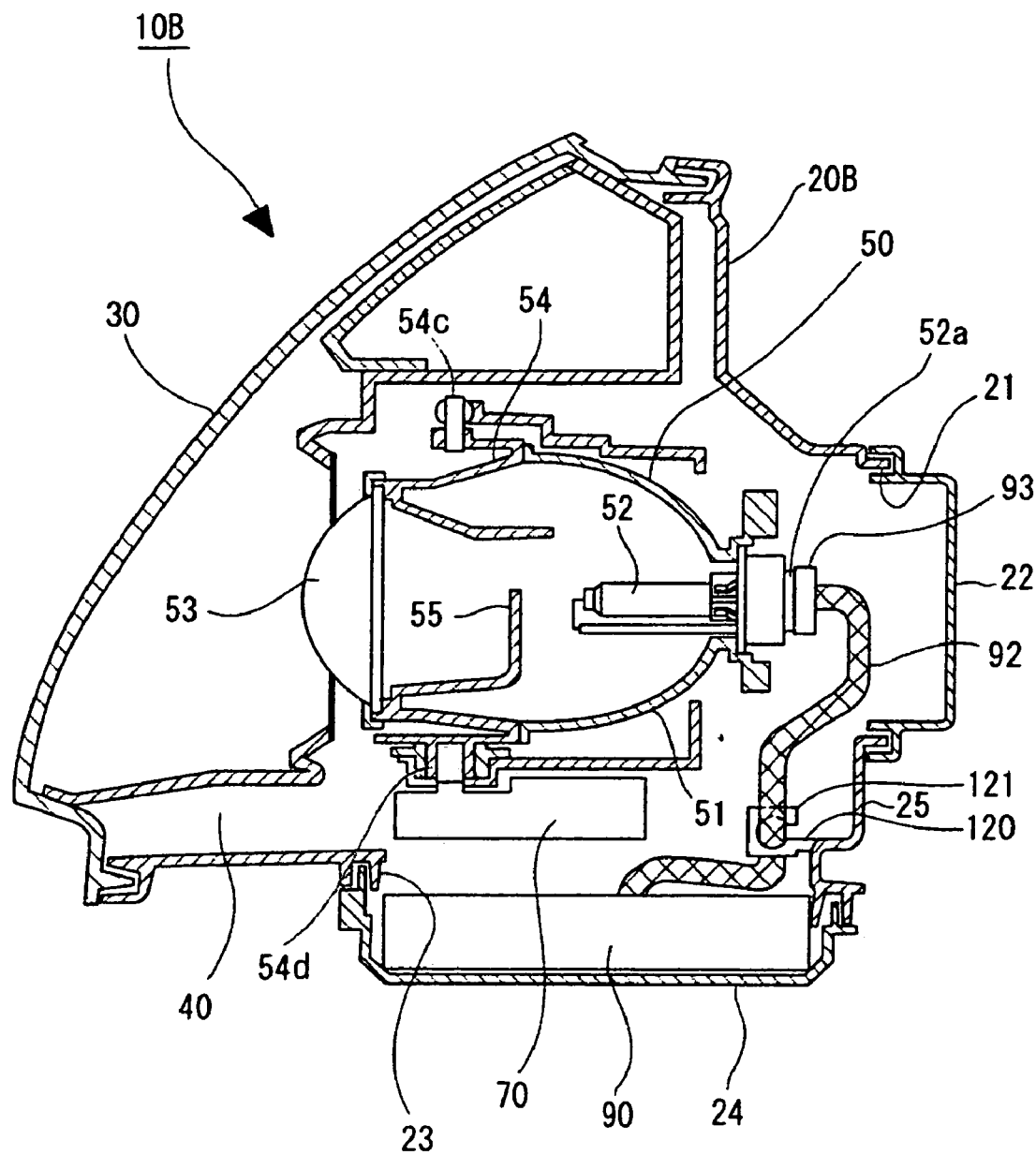
FIG. 8 is a vertical cross-sectional view of the vehicular headlamp of the third embodiment of the present invention.

The cord can be prevented from freely moving, at its middle portion, with respect to the lamp body 20 by other configurations as shown in FIGS. 7 and 8.

In the vehicular headlamp 10A of the second embodiment shown in FIG. 7, a bracket 60A, which is substantially the same as the bracket 60 of the first embodiment, is integrally formed with a cord clamp 110. The cord clamp 110 is disposed as close as possible to the rotational axis of the beam radiation unit 50, that is, the imaginary line that connects the supporting axle 54c and the connection axle 54d. A hook portion 111 is provided on the cord clamp 110, and the middle portion of the cord 92 is held by the hook portion 111.

In the vehicular headlamp 10A of the second embodiment, since the middle portion of the cord 92 that connects the illumination circuit unit 90 and the discharge bulb 52 (bulb socket 93) is held by the cord clamp 110 provided on the bracket 60A, the cord 92 is prevented from being caught by other components or members inside the lamp body 20 when the beam radiation unit 50 is rotated, and damages to those components or members, or to itself (cord), are prevented.

In the vehicular headlamp 10B of the third embodiment shown in FIG. 8, a cord clamp 120 is integrally formed on the lamp body 20B that is substantially the same as the lamp body 20 of the first embodiment. The cord clamp 120 is disposed as close as possible to the rotational axis of the beam radiation unit 50, that is, the imaginary line that connects the supporting axle 54c and the connection axle 54d. A hook portion 121 is provided on the cord clamp portion 120, and the middle portion of the cord 92 is held by the hook portion 121.

In the vehicular headlamp 10B of the third embodiment, since the middle portion of the cord 92 that connects the illumination circuit unit 90 and the discharge bulb 52 (bulb socket 93) is held by the cord clamp 120 provided on the lamp body 20B, the cord 92 is prevented from being caught by other components or members inside the lamp body 20 even when the beam radiation unit 50 is rotated, and damages to those components or members, or to itself (cord), are avoided.

The shape and structure of each portion and element shown in each of the above embodiments show mere examples in implementing the present invention, and these must not be interpreted as restricting the technical scope of the present invention.

As is evident from the above, the vehicular headlamp according to the present invention includes a beam radiation unit that is provided with a discharge bulb as a light source and rotatably supported inside the lamp body, an illumination circuit unit that illuminates the discharge bulb installed in the lamp body, and a cord that connects the illumination circuit unit and the discharge bulb; and in the present invention, the middle portion of the cord is held so that the cord is prevented from moving around with respect to the lamp body.

In the vehicular headlamp of the present invention, since the movement or deformation of the cord due to the rotational movement of the beam radiation unit is restrained, the cord does not scrape against or is not caught by peripheral members when the beam radiation unit is rotated. In addition, the movement of the cord is kept the minimum, and thus the cord is prevented from being broken.

Furthermore, in the present invention, the beam radiation unit is provided, so as to be rotatable in the right and left (horizontal) direction, on a bracket that is supported in the lamp body inclinably; the illumination circuit unit is installed below the beam radiation unit, and the cord is held on the illumination circuit unit and near the rotational axis of the beam radiation unit. Accordingly, the movement or deformation of the cord caused by the rotation of the beam radiation unit is minimized.

Furthermore, in the present invention, the cord is held by the clamp member that is fixed to cover the upper surface of the illumination circuit unit, and the clamp member is located between the cord and the illumination circuit unit. Therefore, the cord and the illumination circuit unit do not contact with each other when the beam radiation unit is rotated, and thus the cord and the illumination circuit unit do not get damaged by the rotational movement of the beam radiation unit.

What is claimed is:

1. A vehicular headlamp comprising a lamp body, a beam radiation unit that includes a discharge bulb as a light source and said beam radiation unit is laterally rotatably supported in said lamp body, an illumination circuit unit that illuminates said discharge bulb provided in said lamp body, and a cord that connects said illumination circuit unit and said discharge bulb, wherein:
    said cord is held at a middle portion thereof so as to be prevented from being moved with respect to said lamp body,
    said beam radiation unit is laterally rotatable in a bracket that is inclinably supported in said lamp body,
    said illumination circuit unit is provided below said radiation unit, and
    said cord is held on an upper surface of said illumination circuit unit and in the vicinity of said beam radiation unit.

2. The vehicular headlamp according to claim 1, wherein said cord is held by a clamp member that is provided on said upper surface of said illumination circuit unit.

3. A vehicular headlamp comprising a lamp body, a beam radiation unit that includes a discharge bulb as a light source and said beam radiation unit is laterally rotatably supported in said lamp body, an illumination circuit unit that illuminates said discharge bulb provided in said lamp body, and a cord that connects said illumination circuit unit and said discharge bulb, wherein said vehicular headlamp is provided with a cord holding means that holds said cord between said illumination circuit unit and said discharge bulb to prevent said cord from moving with respect to said lamp body and said cord holding means comprises a clamp formed in a bracket that supports said beam radiation unit in said lamp body.

* * * * *